United States Patent
Nishino et al.

(10) Patent No.: US 6,857,453 B2
(45) Date of Patent: Feb. 22, 2005

(54) ROTARY WEIGHT FILLER

(75) Inventors: Yukinobu Nishino, Ishikawa-ken (JP);
Tatsuhiro Nakada, Ishikawa-ken (JP);
Akihiko Kakimoto, Ishikawa-ken (JP);
Yutaka Shimizu, Ishikawa-ken (JP)

(73) Assignee: Shibuya Kogyo Co., Ltd., Ishikawa-ken (JP)

( * ) Notice: Subject to any disclaimer, the term of this patent is extended or adjusted under 35 U.S.C. 154(b) by 0 days.

(21) Appl. No.: 10/717,262

(22) Filed: Nov. 19, 2003

(65) Prior Publication Data

US 2004/0103953 A1 Jun. 3, 2004

(30) Foreign Application Priority Data

Nov. 21, 2002 (JP) ........................................ 2002-338309

(51) Int. Cl.$^7$ ................................................. B65B 1/04
(52) U.S. Cl. ........................................ 141/83; 141/144
(58) Field of Search ........................ 141/129, 83, 144, 141/145, 153

(56) References Cited

U.S. PATENT DOCUMENTS

| | | | | |
|---|---|---|---|---|
| 4,635,689 A | * | 1/1987 | Graffin | ........................... 141/1 |
| 5,148,841 A | * | 9/1992 | Graffin | ........................... 141/83 |
| 5,515,888 A | * | 5/1996 | Graffin | ........................... 141/1 |
| 6,655,421 B2 | * | 12/2003 | Kohashi et al. | ................ 141/83 |

* cited by examiner

*Primary Examiner*—Steven O. Douglas
(74) *Attorney, Agent, or Firm*—Flynn, Thiel, Boutell & Tanis, P.C.

(57) ABSTRACT

A plurality of vessel receptacles and load cells are mounted along the outer periphery of a revolving body at an equal circumferential spacing. A filling device is disposed above each of the vessel receptacles. In a first operational mode for filling the receptacles, the tare of each vessel which is supplied onto one of the vessel receptacles is measured and such data is fed to a controller which determines and stores a mean value of measured tares. Subsequently, the operation is switched to a second operational mode for a filling operation. In the second operational mode, no measurement of the tare is made, and the mean value is regarded as representing the tare of supplied vessels for purposes of a filling operation. After a given time interval or after a given number of vessels have been filled, the operation is again switched to the first operational mode where the mean value is again measured. If the new mean value is different from the previous mean value, the stored mean value is rewritten. By using the stored value, the filling operation is initiated at an earlier time than when the tare is measured.

14 Claims, 2 Drawing Sheets

ROTARY WEIGHT FILLER

BACKGROUND OF THE INVENTION AND RELATED ART STATEMENT

The present invention relates to a rotary weight filler which performs a filling operation while measuring a filled content of a vessel by weight measuring means.

A rotary weight filler generally comprises a plurality of vessel receptacles disposed around the outer periphery of a revolving body at an equal circumferential spacing, a plurality of load cells (weight measuring means) mounted on the revolving body and connected to respective vessel receptacles for measuring the weight of a vessel placed on each vessel receptacle, filling means disposed above respective vessel receptacles, and control means for controlling the opening/closing of a filling valve of each filling means, and the arrangement is such that while vessels, which are placed one each on the vessel receptacle, are rotatively conveyed as the revolving body revolves, the tare of a vessel is measured by the load cell, and the filling valve is opened in response to a command signal from the control means to initiate filling a liquid into the vessel.

In a conventional rotary weight filler, the tare of the vessel supplied is measured before the filling valve is opened to initiate a filling operation. Immediately after the vessel has been supplied, the attitude of the vessel is yet unstable and the load cell may be subject to oscillation, preventing the measurement of the weight of the vessel from being performed until the vessel becomes stabilized. Accordingly, it takes a length of time until the tare of the vessel supplied is measured. The control means delivers a fill initiate command signal after the vessel has been supplied and its tare has been measured, and the filling valve is then opened to allow a filling operation to be actually initiated.

To accommodate for this, a rotary weight filler has been proposed (Japanese Laid-Open Patent Publication No. 2002-104303) which allows a fill initiate command signal to be delivered after the vessel has been supplied, but before beginning the measurement of the tare in order to allow the filling operation to be initiated as soon as possible after the completion of the measurement of the tare.

In the rotary weight filler disclosed in this citation, the fill initiate command signal is delivered before beginning the measurement of the tare, and accordingly, it is possible to open the filling valve to initiate the filling operation immediately upon completion of the measurement of the tare, thus allowing a filling interval to be increased in length. Nevertheless an interval to measure the tare of the vessel is still necessary even in this filler, there is a limit on the length to increase the filling interval.

OBJECT AND SUMMARY OF THE INVENTION

Accordingly, it is an object of the present invention to provide a rotary weight filler which enables a filling interval to be increased and which permits a filling capacity and the accuracy of a filling operation to be improved.

Such objects are accomplished by providing a rotary weight filler comprising a plurality of filling means which are disposed along the outer periphery of a revolving body at an equal circumferential spacing, a filling valve for opening or closing a filled liquid passage which is formed in each of the filling means, a plurality of weight measuring means mounted on the revolving body in a manner corresponding to the filling means, and control means for controlling the opening or closing of a corresponding filling valve in response to a signal from the weight measuring means, thereby filling a given quantity of liquid into a vessel supplied wherein the operation is selectively changed between a first operational mode where a filling operation takes place after measuring the tare of the vessel and a second operational mode where a filling operation takes place without measuring the tare of a vessel, and whenever the second operational mode is selected, the value of the tare which is measured during the first operational mode is regarded as the tare of a vessel supplied during the second operational mode and the filling operation is initiated at a point upstream of a point where the filling operation is initiated during the first operational mode.

According to the rotary weight filler of the present invention, the tare of a vessel supplied is measured and a liquid is filled into the vessel in a first operational mode, and subsequently, the operation is switched to a second operational mode where the tare of the vessel is not measured anew, but a measured value for the tare which is obtained during the first operational mode is regarded as the tare of the vessel which is supplied during the filling operation. Accordingly, during the second operational mode, an interval which would be required to measure the tare can be used as a filling interval, thus allowing the length of the filling interval to be increased. Since the tare which has been measured in the immediately preceding first operational mode is regarded as the tare of a vessel which is supplied anew in the second operational mode, there is obtained a tare which is sufficiently accurate without the measurement of the tare.

A rotary weight filler according to the invention defined in claim 2 is characterized in that the operation starts in the first operational mode, and after a reference value is calculated from the measured tare, the operation is switched to the second operational mode where the reference value is regarded as representing the tare of the vessel for the purpose of the filling operation. After a given time interval, the operation returns to the first operational mode again, thus recalculating the reference value for the tare.

While a filling operation is continued over a prolonged period of time in the second operational mode, a measured value obtained by the weight measuring means may vary as by aging effect thereof. However, in the rotary weight filler according to the invention defined in claim 2, the tare is measured again in the first operational mode, and the reference value is recalculated on the basis of the measured value, thus assuring that an accurate value can always be obtained for the tare.

A rotary weight filler according to the invention defined in claim 7 is characterized in that the fill initiate command signal is delivered to initiate a filling operation in the second operational mode after the attitude of a vessel supplied has become stabilized. A rotary weight filler according to the invention defined in claim 8 is characterized in that a fill initiate command signal is delivered before the attitude of a vessel supplied becomes stabilized, but the filling operation is initiated only after the attitude of the vessel has become stabilized.

With the rotary weight filler according to the present invention, there is no need to measure the tare of the vessel in the second operational mode, avoiding the need to wait for the stabilization of the weight measuring means and allowing the filling operation to be initiate as soon as the attitude of the vessel becomes stabilized to initiate the filling operation earlier, thereby increasing the length of the filling interval.

DETAILED DESCRIPTION OF PREFERRED EMBODIMENT

Figure 1:
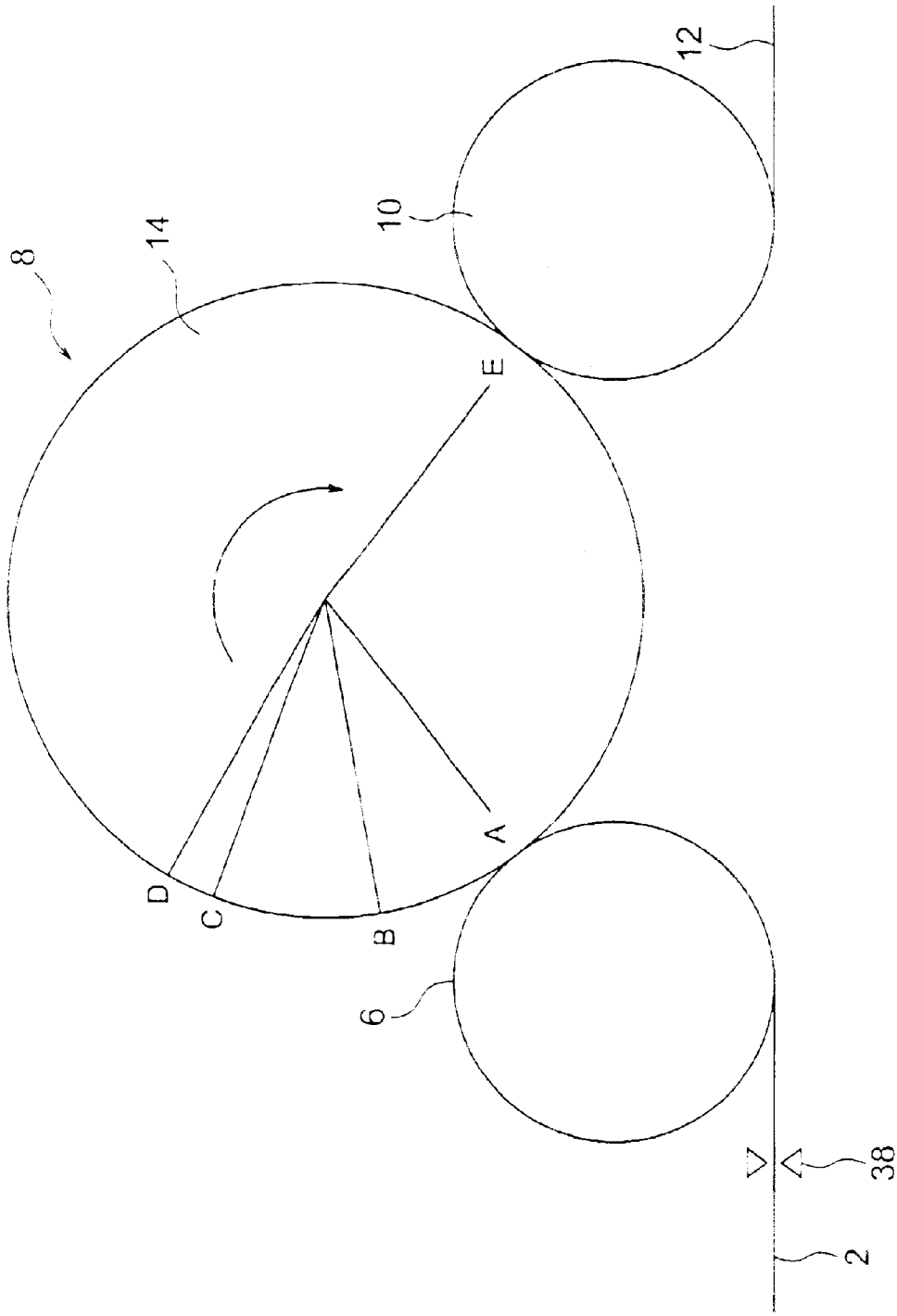
FIG. 1 is a schematic plan view of a rotary weight filler according to one embodiment of the invention.

The present invention will now be described specifically with reference to an embodiment shown in the drawings. A vessel conveyor 2 conveys a vessel 4 to an inlet star wheel 6, through which the vessel is supplied into a rotary weight filler 8. The vessel 4 which is supplied into the rotary weight filler 8 is filled with a liquid while the vessel is being rotatively conveyed, and is then delivered through an outlet star wheel 10 onto a delivery conveyor 12 to be conveyed downstream.

Figure 2:
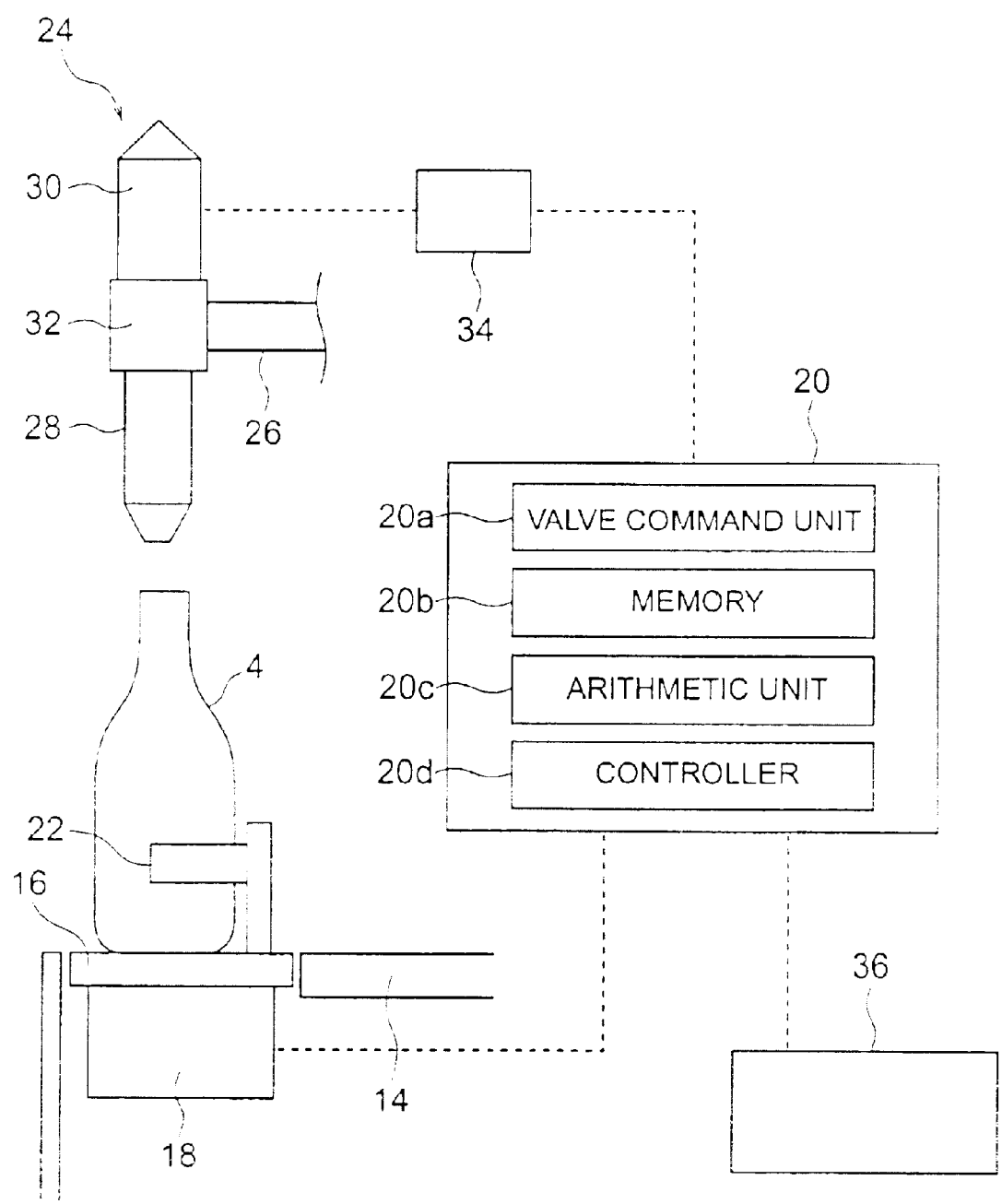
FIG. 2 is a side elevation of an essential part of the rotary weight filler.

The rotary weight filler 8 includes a revolving body 14 which rotates in a horizontal plane and which is mounted on a vertical main shaft, not shown (which is located to the right as viewed in FIG. 2), and a plurality of vessel receptacles 16 are mounted on the revolving body 14 toward the outer periphery thereof at an equal circumferential spacing. A load cell (weight measuring means) 18 is connected to each vessel receptacle 16 for measuring the weight of the vessel 4 which is placed on the vessel receptacle 16. The weight of the vessel 4 which is measured by the load cell 18 is input to a controller 20. The controller 20 includes a valve command unit 20a, a memory 20b, an arithmetic unit 20c and a control unit 20d. It is to be understood that a gripper 22 is mounted on the top surface of the vessel receptacle for holding the vessel 4 which is placed on the vessel receptacle 16.

A filling means 24 is disposed above each vessel receptacle 16 for filling a liquid into the vessel 4. Each of the filling means 24 comprises a nozzle 28 for projecting a liquid to be filled which is supplied from a filled liquid tank, not shown, through a liquid supply pipe 26, into the vessel 4, and a filling valve 32 which is opened or closed in response to an air cylinder 30 to allow a communication between or to interrupt a filled liquid passage (not shown) from the liquid supply pipe 26 to the nozzle 28. The air cylinder 30 is operated by switching an air passage by a solenoid operated valve 34 in response to an open/close command signal from the valve command unit 20a of the controller 20.

In the present embodiment, the filler is operated by switching between two operational modes. In the first operational mode, the tare of the vessel 4 which is supplied into the rotary weight filler 8 is measured, and then a filling operation takes place with respect to the vessel 4. The value of the tare which is measured by the load cell 18 in the first operational mode is fed to the controller 10, and the arithmetic unit 20b calculates a mean value of the tare for a given number of vessels 4, and the mean value is stored in the memory 20c. In the second operational mode, the measurement of the tare of the vessel 4 supplied is not made, but the mean value of the tare for the vessels 4 which have been subject to the measurement in the first operational mode is regarded as the tare of the vessel 4 supplied for purpose of the filling operation.

It is to be noted that an encoder 36 which delivers a pulse signal for each incremental angle of rotation is provided on the revolving body 14, and the pulse signal from the encoder 36 is input to the controller 22. A vessel sensor 38 is mounted on the vessel conveyor 2 at a location immediately in front of the inlet star wheel 6 for detecting the presence or absence of the vessel 4 so that if the vessel 4 is not supplied to the vessel receptacle 16, the filling valve 32 of the filling means 24 which corresponds to that vessel 16 cannot be opened.

The operation of the rotary weight filler constructed in the manner mentioned above will now be described. A vessel 4 which is conveyed by the vessel conveyor 2 is handed over, through the inlet star wheel 6, onto the revolving body 14 of the rotary weight filler 8 at a vessel carry-in position A shown in FIG. 1 to be placed one each on the vessel receptacle 16.

In a zone from the carry-in position A to a given rotational position B, the vessel 4 which is carried onto the revolving body 14 does not have a stabilized attitude, but may be subject to an oscillation. Accordingly, the zone A-B represents a vessel stabilization zone where the attitude of the vessel 4 is to be stabilized. The load cell 18 may also be subject to an oscillation of an increased magnitude as a result of a vessel 4 being placed on the vessel receptacle, and the zone A-B also represents a first stabilization zone for the load cell 18.

In a subsequent zone which extends from the position B to a position C, the vessel 4 has already been stabilized, and the load cell 18 is becoming stabilized immediately after passing the position B, but still suffers from a degree of oscillation, and it is difficult to measure the tare of the vessel 4. At the time the load cell 18 has reached the position C, the load cell 18 becomes stabilized, and thus the zone B-C represents a second stabilization zone for the load cell 18.

In the first operational mode, the tare of the vessel 4 supplied is made in a zone extending from position C to position D where the vessel 4 has become stabilized and the load cell 18 is no longer subject to oscillation. The measured value of the tare of the vessel 4 is fed to the controller 20. Subsequently, after passing through the position D, the valve command unit 20a of the controller 20 delivers a command signal to open the filling valve 32 in order to perform a filling operation of the vessel 4. Alternatively, the command signal to open the filling valve 32 may be delivered before the vessel 4 passes through the position D so that the filling operation can be initiated as soon as the vessel 4 has passed through the position D. The filling operation is completed at a point located short of a discharge position E to the outlet star wheel 10, and the vessel 4 which is filled with a liquid is handed over through the outlet star wheel 10 to the delivery conveyor 12.

In the first operational mode mentioned above, the measurement of the tare takes place for all the vessels 4 supplied during the time the revolving body 14 undergoes two full revolutions, for example, and the arithmetic unit 20b of the controller 20 calculates a mean value of the tare for all the vessels 4 which have been subject to the measurement, and the mean value thus obtained is stored in the memory 20c. However, it is to be understood that the time period for the first operational mode is not limited to the period required for the two full revolutions of the revolving body 14, but may be suitably chosen.

The operation takes place in the first operational mode for a given number of vessels or for a given time interval, and after a mean value of the tare for the measured vessels is calculated, the operation is switched to the second operational mode. In the second operational mode, no measurement of the tare takes place, and the timing when the filling operation is initiated is chosen earlier than during the first operational mode. Specifically, when the vessel 4 supplied onto the revolving body 14 at the vessel carry-in position A reaches the position B, the vessel 4 obtains a stable attitude, and accordingly, a fill initiate command signal is delivered upon passage through the position B to initiate the filling operation. Alternatively, the fill initiate command signal may be delivered before the vessel 4 passes the position B, and a filing operation may be initiated immediately upon passage through the position B. In this manner, the timing when the filling operation is initiated can be chosen earlier in the second operational mode to increase the length of the filling interval or the filling time interval, thus allowing the accuracy of the filling operation to be improved. The filling capacity can also be improved by accelerating the running speed.

It is to be noted that in the zone extending from the carry-in position A to position B, the vessel 4 is not stabilized, and therefore, the liquid to be filled which is discharged from the nozzle 28 may fail to fill the vessel 4, causing a liquid splash. In addition, the load cell 18 may be undergoing an oscillation of an increased magnitude, and there results an error of an increased magnitude if the filling operation is attempted. For this reason, the filling operation does not take place in the zone A-B, but is initiated after passing through the position B even in the second operational mode where no measurement of the tare is made. However, it should be understood that the filling operation is not always inhibited until the vessel passes through the position B, and it may be possible to initiate the filling operation in the zone A-B depending on the handling technique of the vessel 4 or an improvement in the performance of the load cell 18.

As mentioned above, the filler is operated in the first operational mode by measuring the tare of vessels 4 and obtaining a mean value of the measured values while in the second operational mode, no measurement of the tare of vessels 4 supplied is made, but the mean value obtained during the first operational mode is regarded as the tare of the vessel 4 for purpose of the filling operation. However, the operation is again switched to the first operational mode after a given time interval, and a mean value of the tare for the measured vessels 4 is obtained. The new mean value of the tare is compared against the previous mean value. If the new mean value is different from the previous mean value, the mean value which is stored in the memory 20c is rewritten to define the new mean value of the tare for use in the operation according to the second operational mode. A time interval of the second operational mode after which the operation is again switched to the first operational mode is determined in consideration of the time or the number of filled vessels. However, the load cells 18 undergo a relatively large aging effect, and hence, it is preferred that the operation be switched from the second to the first operational mode after a given time interval for rewriting the mean value.

In the described embodiment, the mean value of the tare for the vessels 4 which have been measured in the first operational mode is obtained, and is used by regarding it as representing the tare of vessels 4 which are supplied during the operation in the second operational mode. However, the value (the reference value) which is regarded as representing the tare of the vessels 4 operated in the second operational mode is not always limited to a mean value. Alternatively, the reference value may be one of the measured values which appears with a highest frequency or may be a median value among a queue of measured values arranged in an ascending or descending order. While the present invention is applicable to any variety of vessels, it is most effectively used with synthetic resin vessels such as PET vessels, in particular, because of a small variation in the weight error of individual vessels.

What is claimed is:

1. A rotary weight filler comprising a plurality of filling devices which are disposed along an outer periphery of a revolving body at an equal circumferential spacing, a filling valve for opening or closing a filled liquid passage which is formed in each of the filling devices, a plurality of weight measuring devices mounted on the revolving body in a manner corresponding to the filling devices, and a controller for controlling the opening or closing of a corresponding filling valve in response to a signal from the corresponding weight measuring device, thereby filling a given quantity of liquid into a vessel;

wherein the operation is selectively changed between a first operational mode where a filling operation takes place after measuring the tare of the vessel and a second operational mode where a filling operation takes place without measuring the tare of a vessel, and whenever the second operational mode is selected, the value of the tare which is measured during the first operational mode is regarded as the tare of each vessel supplied during the second operational mode and the filling operation is initiated at a point upstream of a point where the filling operation is initiated during the first operational mode.

2. A rotary weight filler according to claim 1, wherein the operation is initiated in the first operational mode, and after a reference value calculated from the measured tare is regarded as representing the tare of the vessel for the filling operation, the operation is switched to the second operational mode, and after a given time interval, the filler is again operated in the first operational mode to recalculate the reference value for the tare.

3. A rotary weight filler according to claim 2, wherein the reference value for the tare is a mean value of measured values.

4. A rotary weight filler according to claim 2, wherein the reference value of the tare is one of the measured values which appears with a highest frequency.

5. A rotary weight filler according to claim 2, wherein the reference value for the tare is a median value in a queue of measured values arranged in an ascending or descending order.

6. A rotary weight filler according to claim 1, wherein in the first operational mode, the tare of each vessel is measured after the attitude of the vessel supplied has become stabilized and after the weight measuring device has become stabilized.

7. A rotary weight filler according to claim 1, wherein in the second operational mode, a fill initiate command signal is delivered to initiate a filling operation after an attitude of the vessel supplied has become stabilized.

8. A rotary weight filler according to claim 1, wherein in the second operational mode, a fill initiate command signal is delivered before an attitude of the vessel supplied becomes stabilized, and the filling operation is initiated after the attitude of the vessel has become stabilized.

9. A rotary weight filler apparatus for receiving and filling vessels with a given quantity of liquid comprising:

a revolving body;

a plurality of filling devices circumferentially spaced and disposed along an outer periphery of the revolving body, each said filling device including a filling valve for opening or closing a corresponding filled liquid passage and a nozzle connected to a corresponding said filling valve for outputting a liquid;

a plurality of weight measuring devices mounted about the outer periphery of the revolving body, each said weight measuring device corresponding to one of said plurality of filling devices and adapted to receive a vessel thereon; and a controller controlling in a first operating mode to open a corresponding said filling valve after a first predetermined time that corresponds to the sum of 1) a vessel stabilization time zone needed for a vessel to stabilize after placement onto the weight measuring device, 2) a load cell stabilization time zone needed for a weight measuring device to stabilize after placement of a vessel thereon, and 3) a tare measuring time zone required for completing measurement of the weight of a vessel by the corresponding weight measuring device, and said controller controlling closing said corresponding filling valve in response to a signal from the corresponding weight measuring device, wherein the controller determines a reference value for the tare of each corresponding vessel determined during the first operating mode, and said controller controlling in a second operating mode to open the corresponding said filling valve after a second predetermined time that corresponds to the sum of 1) the vessel stabilization time zone and 2) the load cell stabilization time zone, so that the second operating mode begins initial filling of each corresponding vessel without measuring the tare of a corresponding vessel, said second predetermined time being less than said first predetermined time, and said controller closing the corresponding filling valve in response to a signal from the corresponding weight measuring device.

10. The rotary weight filler according to claim 9, wherein in the second operating mode said filling valve operates at a lower filling rate than in the first operating mode.

11. The rotary weight filler according to claim 9, wherein the controller automatically periodically transfers from the second operating mode to the first operating mode after a second operating mode predetermined time interval to again determine the reference value for the tare of a corresponding vessel.

12. The rotary weight filler according to claim 11, wherein the reference value for the tare comprises a mean value of measured values during a first operating mode time interval.

13. The rotary weight filler according to claim 11, wherein the reference value for the tare comprises the measured value that occurs the most times during a first operating mode time interval.

14. The rotary weight filler according to claim 11, wherein the reference value for the tare comprises a median value of the measured values that occur during a first operating mode time interval.

* * * * *